US011859550B2

(12) United States Patent
Longhurst et al.

(10) Patent No.: US 11,859,550 B2
(45) Date of Patent: Jan. 2, 2024

(54) COMPOUND ANGLE ACCELERATOR

(71) Applicant: General Electric Company, Schenectady, NY (US)

(72) Inventors: James Daniel Longhurst, Marblehead, MA (US); Antonio C. Gominho, Andover, MA (US); Jordan Paule Tesorero, Cincinnati, OH (US); Jonathan David Baldiga, Amesbury, MA (US); Orin J. Hall, Malden, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/219,988

(22) Filed: Apr. 1, 2021

(65) Prior Publication Data

US 2022/0316397 A1 Oct. 6, 2022

(51) Int. Cl.
*F02C 7/18* (2006.01)
*F01D 25/12* (2006.01)

(52) U.S. Cl.
CPC ........... *F02C 7/18* (2013.01); *F01D 25/12* (2013.01); *F05D 2220/32* (2013.01); *F05D 2230/31* (2013.01); *F05D 2260/201* (2013.01)

(58) Field of Classification Search
CPC ................................. F01D 5/081; F01D 25/12
See application file for complete search history.

(56) References Cited

U.S. PATENT DOCUMENTS

| 3,989,410 | A | 11/1976 | Ferrari |
| 4,397,471 | A | 8/1983 | Feldman et al. |
| 4,822,244 | A | 4/1989 | Maier et al. |
| 5,402,636 | A | 4/1995 | Mize et al. |
| 7,048,497 | B2 | 5/2006 | Arilla et al. |
| 8,381,533 | B2 | 2/2013 | Smoke et al. |
| 8,562,285 | B2 * | 10/2013 | McCaffrey ................ F02C 7/28 415/176 |
| 8,899,924 | B2 * | 12/2014 | Alvanos .................... F02C 7/18 416/116 |
| 9,945,248 | B2 * | 4/2018 | McCaffrey .............. F01D 11/02 |
| 10,094,229 | B2 * | 10/2018 | Snyder ...................... F02C 7/18 |
| 2017/0101896 | A1 | 4/2017 | Manning et al. |
| 2018/0135517 | A1 | 5/2018 | Mook et al. |
| 2018/0209284 | A1 | 7/2018 | Day et al. |

* cited by examiner

*Primary Examiner* — Courtney D Heinle
*Assistant Examiner* — John S Hunter, Jr.
(74) *Attorney, Agent, or Firm* — Dority & Manning, P.A.

(57) ABSTRACT

Accelerators, methods of manufacturing accelerators, and gas turbine engines are provided. For example, an accelerator for a gas turbine engine defines a radial direction and an axial direction and comprises an annular outer wall, an annular inner wall, an annular channel defined between the outer and inner walls, and a plurality of vanes disposed within the channel. The channel has an inlet for ingress of a cooling fluid and an outlet for egress of the cooling fluid. Each vane extends from the outer wall to the inner wall adjacent the outlet, which is angled such that an exit angle of the cooling fluid is nonzero with respect to both the radial and axial directions. The accelerator may be manufactured using an additive manufacturing method. The accelerator outlet may be disposed immediately upstream of a first turbine rotor blade stage of a gas turbine engine to direct the cooling fluid thereto.

15 Claims, 5 Drawing Sheets

COMPOUND ANGLE ACCELERATOR

FIELD

The present subject matter relates generally to gas turbine engines and, more particularly, to gas turbine engine accelerators.

BACKGROUND

Gas turbine engines often operate at high temperatures, with some portions of a given engine operating at a higher temperature than other portions of the engine. Features such as accelerators may be used to direct a cooling fluid, e.g., ambient air or engine bleed air, to an engine component requiring cooling. For instance, an accelerator may be disposed upstream of a stage of rotor blades within the engine, and the accelerator may direct a cooling fluid flow to the rotor blades. However, typical accelerators are formed using casting techniques that can lead to fluid leakage, etc. that degrades performance of the accelerator. Moreover, typical accelerators can provide the cooling fluid such that it the cooling fluid is largely stagnant compared to the speed of the rotor blades, which can impact clearance and coupling between the accelerator and the rotor blade stage, as well as lead to parasitic power losses in the rotor cavity and pressure losses in the cooling supply circuit, thereby affecting performance of the system. Accordingly, improved accelerators that address one or more of the challenges noted above would be useful.

BRIEF DESCRIPTION

Aspects and advantages of the invention will be set forth in part in the following description, or may be obvious from the description, or may be learned through practice of the invention.

In one exemplary embodiment of the present subject matter, an accelerator for a gas turbine engine is provided. The accelerator defines a radial direction and an axial direction and comprises an annular outer wall, an annular inner wall, an annular channel defined between the outer wall and the inner wall, and a plurality of vanes disposed within the channel. The channel has an inlet for ingress of a cooling fluid into the channel and an outlet for egress of the cooling fluid from the channel. Each vane of the plurality of vanes extends from the outer wall to the inner wall adjacent the outlet. The outlet is angled such that an exit angle of the cooling fluid is nonzero with respect to the radial direction and is nonzero with respect to the axial direction.

In another exemplary embodiment of the present subject matter, a method of manufacturing an accelerator for a gas turbine engine is provided. The method comprises depositing a layer of additive material on a bed of an additive manufacturing machine and selectively directing energy from an energy source onto the layer of additive material to fuse a portion of the additive material and form the accelerator. The accelerator comprises an annular outer wall, an annular inner wall, an annular channel defined between the outer wall and the inner wall, and a vane disposed within the channel. The channel includes an inlet for ingress of a cooling fluid into the channel and an outlet for egress of the cooling fluid from the channel. The vane extends from the outer wall to the inner wall adjacent the outlet. The outlet is angled such that an exit angle of the cooling fluid has a nonzero radial portion and a nonzero axial portion. The outer wall, the inner wall, and the vane are integrally formed as a single monolithic component.

In a further exemplary embodiment of the present subject matter, a gas turbine engine is provided. The gas turbine engine comprises a combustor, a first turbine stator vane stage disposed immediately downstream of the combustor and comprising an annular array of stator vane airfoils, a first turbine rotor blade stage disposed immediately downstream of the first turbine stator vane stage and comprising an annular array of rotor blade airfoils coupled to a rotatable shaft, and an accelerator circumferentially surrounding the shaft. The accelerator comprises an annular channel for receipt of a cooling fluid. The channel includes an outlet defining a compound exit angle for the cooling fluid. The outlet of the accelerator is disposed immediately upstream of the first turbine rotor blade stage to direct the cooling fluid to the first turbine rotor blade stage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
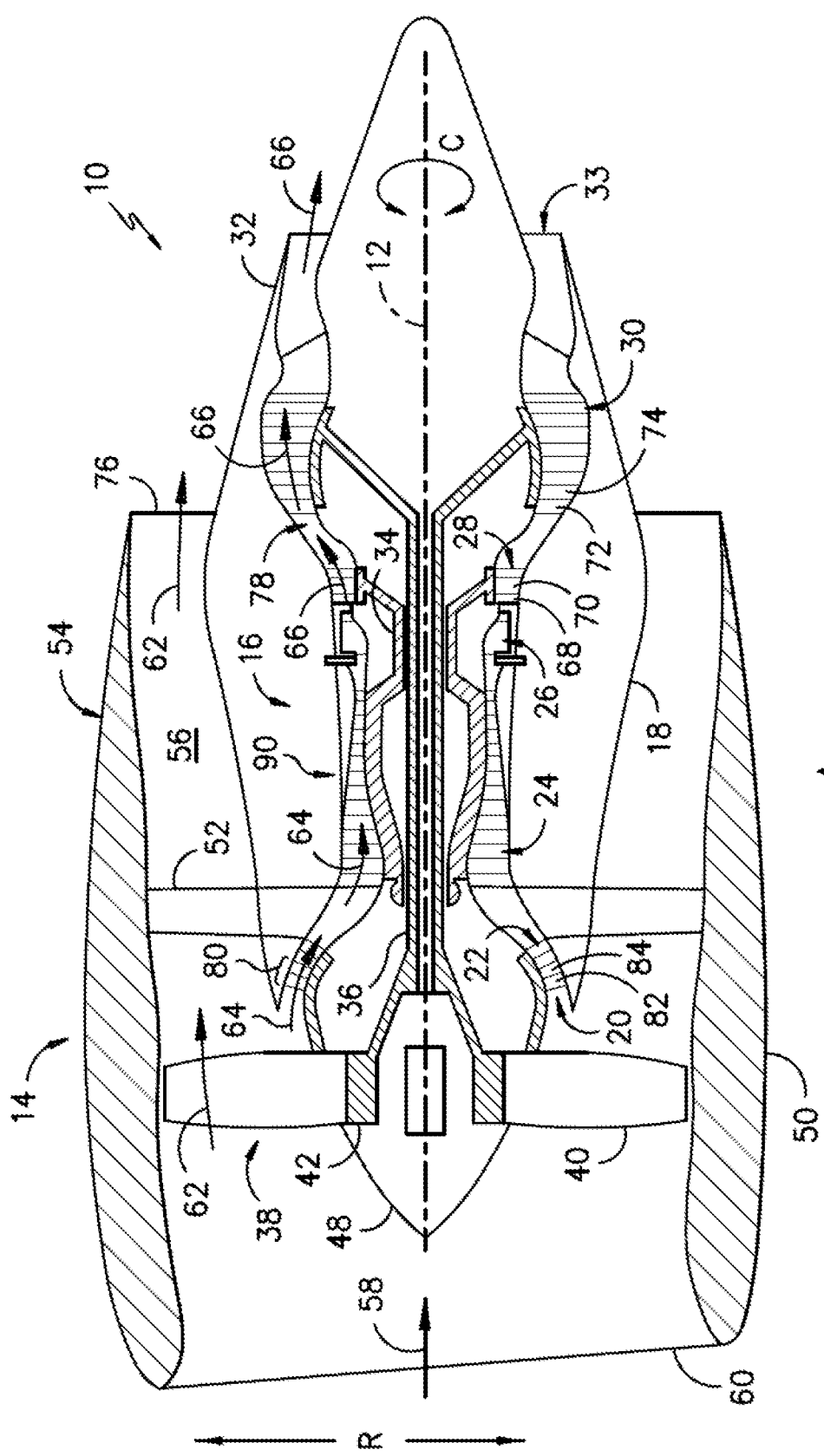
FIG. 1 provides a schematic cross-section view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream"

and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine exhaust, or a component being relatively closer to the engine exhaust as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter is directed to gas turbine engine accelerators having compound exit angles. More particularly, the present subject matter is directed to an accelerator that defines a radial direction and an axial direction and comprises an annular outer wall, an annular inner wall, and an annular channel defined therebetween having an outlet for egress of a cooling fluid from the channel. The outlet is angled such that an exit angle of the cooling fluid is nonzero with respect to the radial direction and is nonzero with respect to the axial direction. Further, at least one of the inner wall and the outer wall may have a first length defined at a first non-zero angle with respect to the axial direction and a second length defined at a second non-zero angle with respect to the axial direction. In exemplary embodiments, the outlet is disposed immediately upstream of a first turbine rotor blade stage to direct the cooling fluid to the first turbine rotor blade stage.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a circumferential direction C (extending about the longitudinal centerline 12 and the axial direction A), and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk or hub 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, the disk 42 is covered by a rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the compressor section and into the combustion section 26, where it is mixed with fuel and burned to provide combustion gases 66. More particularly, the compressor section includes the LP compressor 22 and the HP compressor 24 that each may comprise a plurality of compressor stages 80, with each stage 80 including both an annular array or circumferential row of stationary compressor vanes 82 (also referred to as compressor stator vanes 82) and an annular array or circumferential row of rotating compressor blades 84 (also referred to as compressor rotor blades 84) positioned immediately downstream of the compressor vanes 82. The plurality of compressor blades 84 in the LP compressor 22 are coupled to the LP shaft or spool 36, and the plurality of compressor blades in the HP compressor 24 are coupled to the HP shaft or spool 34. The plurality of compressor vanes 82 in the LP compressor 22 are coupled to a compressor casing, and the plurality of compressor vanes 82 in the HP compressor 24 are coupled to a compressor casing; at least a portion of the HP compressor vanes 82 are coupled to compressor casing 90. In some embodiments, the compressor casing 90 may extend through both the LP compressor 22 and the HP compressor 24 and support all of the compressor vanes 82. In other embodiments, the compressor casing 90 supports only a portion of the compressor vanes 82 and may support only a portion of the compressor vanes 82 in the HP compressor 24. As previously described, as the second portion of air 64 passes through the sequential stages of compressor vanes 82 and blades 84, the volume of air 64 is pressurized, i.e., the pressure of the air 64 is increased prior to combustion with fuel in the combustion section 26 to form the combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Although the gas turbine engine of FIG. 1 is depicted in a turboshaft configuration, it will be appreciated that the teachings of the present disclosure can apply to other types of turbine engines, turbomachines more generally, and other shaft systems. For example, the turbine engine may be another suitable type of gas turbine engine, such as e.g., a turboprop, turbojet, turbofan, aeroderivatives, etc. The present disclosure may also apply to other types of turbomachinery, such as e.g., steam turbine engines.

Figure 2:
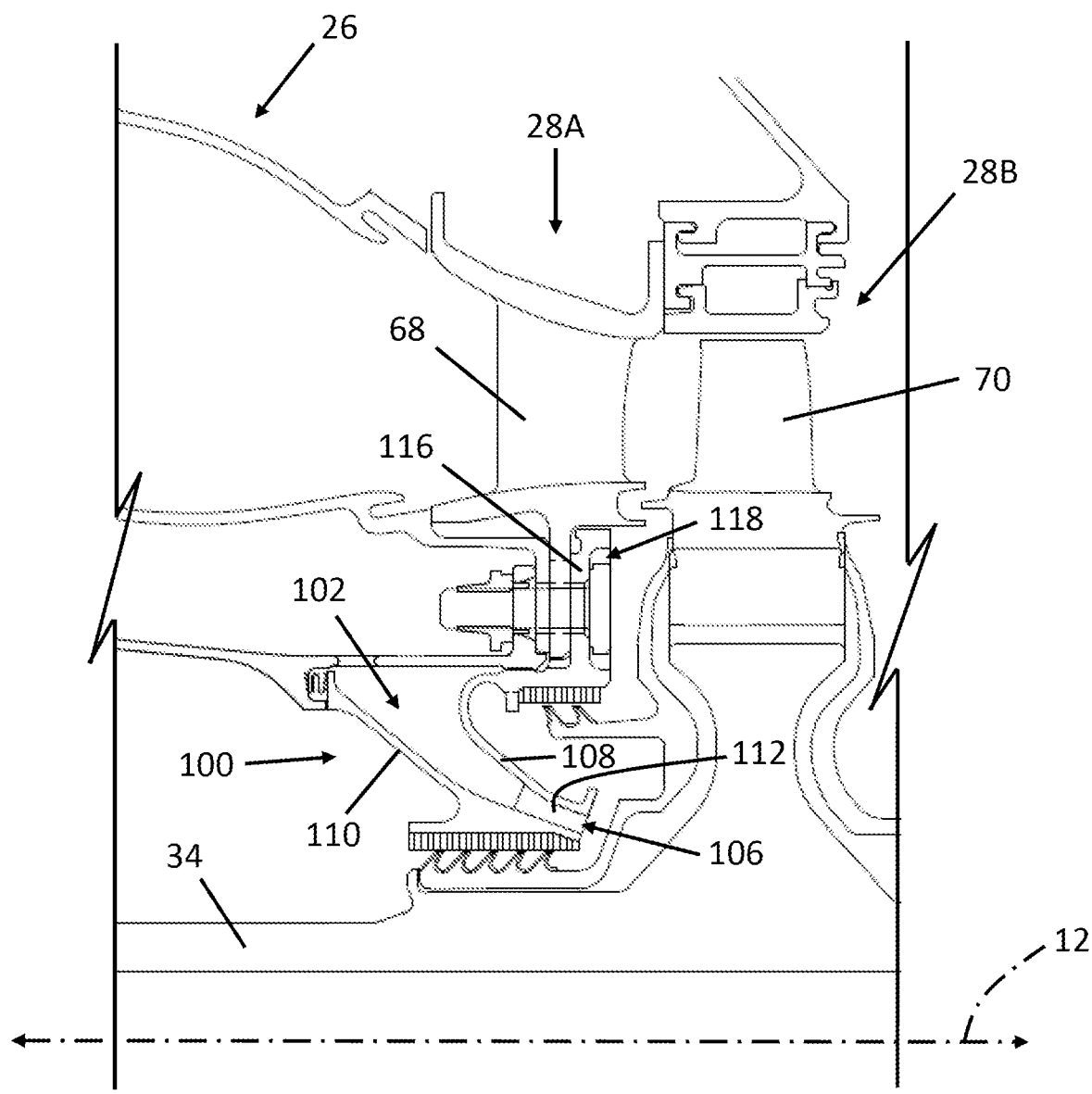
FIG. 2 provides a schematic cross-section view of a portion of the combustion section and high pressure (HP) turbine section of the gas turbine engine of FIG. 1, according to an exemplary embodiment of the present subject matter.

FIG. 2 provides a schematic cross-sectional view of a portion of the combustion section 26 and the HP turbine 28. More particularly, FIG. 2 illustrates an accelerator 100 disposed in a gas turbine engine, such as the core turbine engine 16 of the turbofan 10. The gas turbine engine 16 includes a combustor 26, a first turbine stator vane stage 28A of the HP turbine 28 disposed immediately downstream of the combustor 26, and a first turbine rotor blade stage 28B of the HP turbine 28 disposed immediately downstream of the first turbine stator vane stage 28A. The first turbine stator vane stage 28A comprises an annular array of stator vane airfoils 68, and the first turbine rotor blade stage 28B comprises an annular array of rotor blade airfoils 70. The rotor blade airfoils 70 are coupled to a rotatable shaft, i.e., the HP shaft or spool 34. The accelerator 100 circumferentially surrounds the shaft 34. The accelerator 100 comprises an annular channel 102 for receipt of a cooling fluid F. The channel includes an inlet 104 for receipt of the cooling fluid F, and an outlet 106 defining a compound exit angle for the cooling fluid F. The outlet 106 is disposed immediately upstream of the first turbine rotor blade stage 28B to direct the cooling fluid F to the first turbine rotor blade stage 28B.

Figure 3:
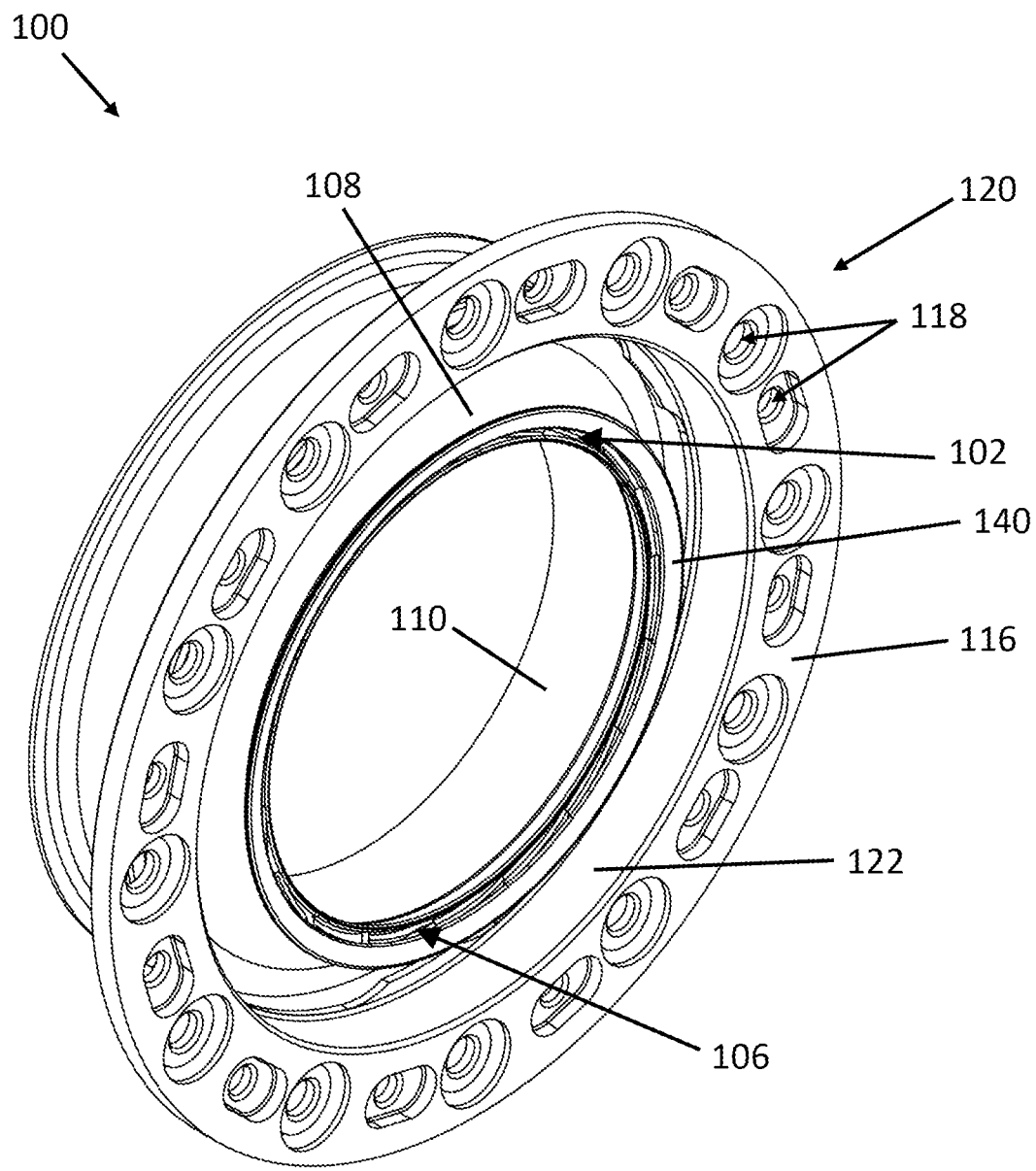
FIG. 3 provides an aft perspective view of an accelerator according to an exemplary embodiment of the present subject matter.

FIGS. 3, 4A and 4B illustrate the accelerator 100 in greater detail. As shown in FIGS. 3 and 4A, the accelerator 100 defines a radial direction R and an axial direction A. The accelerator 100 comprises an annular outer wall 108 and an annular inner wall 110 that define the annular channel 102 therebetween. As described above, the channel 102 has inlet 104 for ingress of the cooling fluid F into the channel 102 and outlet 106 for egress of the cooling fluid F from the channel 102. The accelerator 100 has an overall annular shape and, as such, encircles the rotor 34 such that the rotor 34 passes therethrough. An axial centerline of the accelerator 100 may be aligned generally along a longitudinal centerline of the rotor 34 (which may be disposed along the longitudinal centerline 12 of the engine 10).

Further, a plurality of vanes 112 are disposed within the channel 102. Each vane 112 extends from the outer wall 108 to the inner wall 110, and each vane 112 is disposed adjacent the outlet 106. Moreover, each vane 112 has a shape configured to induce a tangential flow of the cooling fluid F upon egress from the outlet 106. That is, the vanes 112 are shaped to turn the flow of the cooling fluid F tangential to the rotor blades 70 of the first turbine rotor blade stage 28B. As described in greater detail herein, the outer wall 108, the inner wall 110, and the plurality of vanes 112 are integrally formed as a single monolithic component, e.g., using an additive manufacturing process.

As previously described, the outlet 106 defines a compound exit angle for the cooling fluid F. For instance, as shown in FIGS. 4A and 4B collectively, the outlet 106 is angled such that an exit angle α of the cooling fluid F is nonzero with respect to the radial direction R and is nonzero with respect to the axial direction A. That is, the exit angle α of the cooling fluid F is angled with respect to both the radial direction R and the axial direction A such that the exit angle α is nonzero when measured with respect to the radial direction R ($\alpha_{radial}$) and is nonzero when measured with respect to the axial direction A ($\alpha_{axial}$). The cooling fluid channel having a compound exit angle α of the exemplary embodiments described herein may have a greater portion of its length extending along the radial direction R than typical designs, which usually extend substantially along an axial direction such that the exiting flow is substantially axial.

Figure 4:
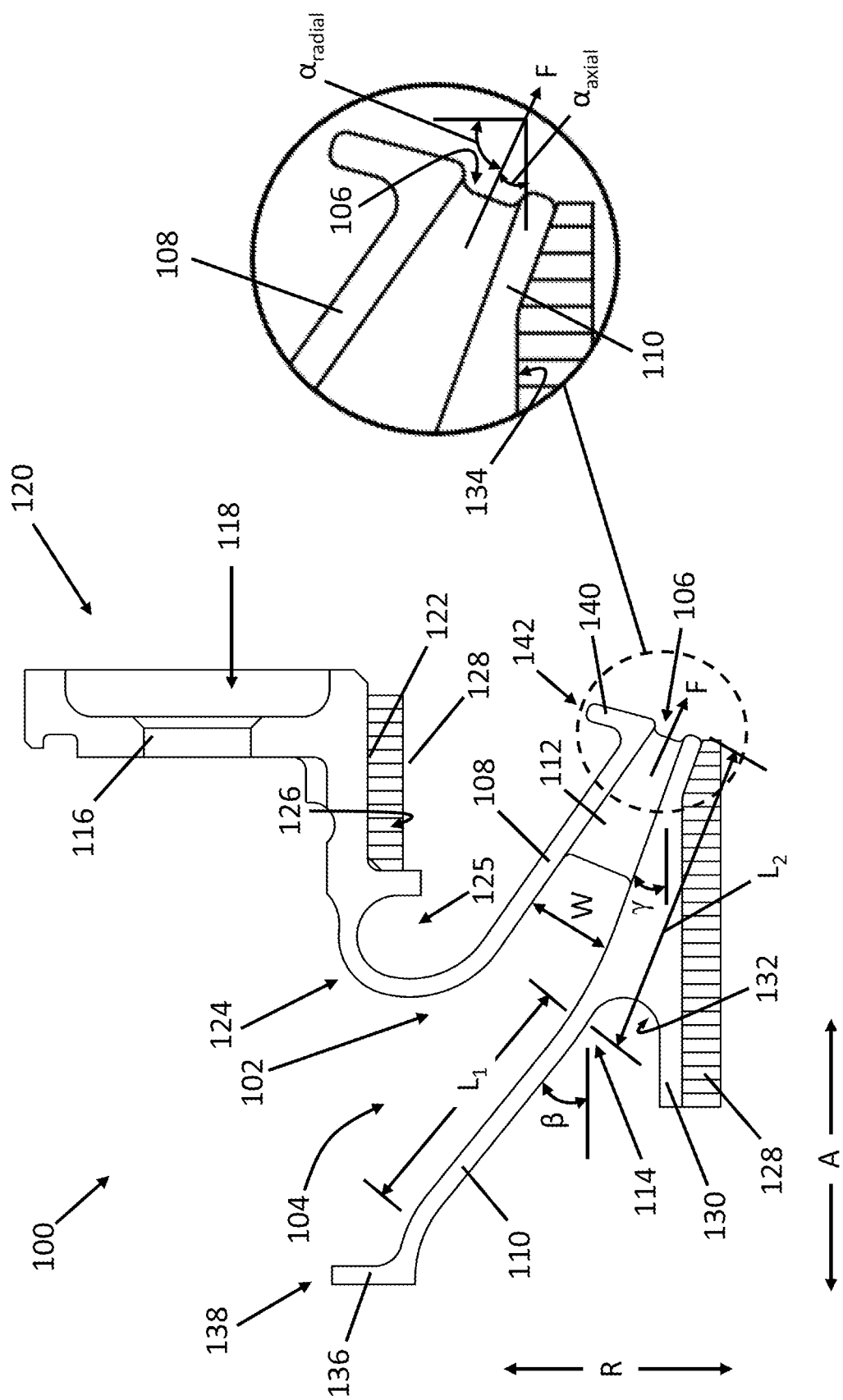
FIGS. 4A and 4B provide a cross-section view and an enlarged partial view respectively of the exemplary accelerator of FIG. 3.

More particularly, as illustrated in the exemplary embodiment of FIG. 4A, the inner wall 110 is angled with respect to the axial direction A, as well as the radial direction R. That is, the inner wall 110 is defined at a nonzero angle with respect to both the axial direction A and the radial direction R. As shown in FIG. 4A, the channel 102 comprises a mid-portion 114 located between the inlet 104 and the outlet 106. In some embodiments, the mid-portion 114 may be approximately halfway between the inlet 104 and the outlet 106 along a length of the channel 102 measured from the inlet 104 to the outlet 106. In other embodiments, the mid-portion 114 may be closer to the inlet 104 or closer to the outlet 106 rather than the approximate halfway location between the inlet 104 and the outlet 106. In the depicted embodiment, the inner wall 110 is defined at a first nonzero angle β with respect to the axial direction A over a first length $L_1$, and the inner wall 110 is defined at a second nonzero angle γ with respect to the axial direction over a second length $L_2$. The first length $L_1$ extends from the inlet 104 to the mid-portion 114, and the second length $L_2$ extends from the mid-portion 114 to the outlet 106. As shown in FIG. 4, the first nonzero angle β is larger than the second nonzero angle γ, i.e., β>γ. In other embodiments, however, the second nonzero angle γ may be larger than the first nonzero angle β such that β<γ. Further, the first and second lengths $L_1$, $L_2$ may extend over other portions of the inner wall 110, although one of the first length $L_1$ and second length $L_2$ is defined adjacent the outlet 106 to provide the exiting cooling fluid F at an angle with respect to the radial and axial directions R, A.

In the illustrated embodiment, unlike the inner wall 110, the outer wall 108 is not defined at two different nonzero angles with respect to the axial direction A. It will be appreciated that, in other exemplary embodiments, the outer wall 108 also may be defined at two or more nonzero angles with respect to the axial direction A. Further, the inner wall 110 may be defined at more than two nonzero angles with respect to the axial direction A. In some embodiments, the outer wall 108 may be defined at multiple nonzero angles with respect to the axial direction A while the inner wall 110 is not defined at multiple nonzero angles with respect to the axial direction A (e.g., may be defined at only one nonzero angle with respect to the axial direction A). In still other embodiments, one of the outer wall 108 and the inner wall 110 (or a portion thereof) may be substantially parallel to the axial direction A while the other of the outer wall 108 and the inner wall 110 is defined at multiple nonzero angles with respect to the axial direction A. It will be appreciated that the multiple nonzero angles of the outer wall 108 and/or inner wall 110 help define the compound exit angle of the cooling fluid F.

As further depicted in FIGS. 4A and 4B collectively, the channel outlet 106 is angled radially inward such that the channel inlet 104 is disposed radially outward of the outlet 106. More particularly, the outlet 106 is angled such that the outlet 106 directs the flow of the cooling fluid F radially inward with respect to the first turbine rotor blade stage 28B. As such, the cooling fluid F is directed toward the rotor 34 (i.e., the HP shaft or spool 34 in the illustrated exemplary embodiment) to help cool the rotor 34. By angling the flow of the cooling fluid F as it exits the channel 102, as well as using the vanes 112 to direct the cooling fluid flow tangential to the rotor 34, the cooling fluid flow may be sped up to the tangential speed of the rotor 34 and rotor blades 70. In exemplary embodiments, the channel 102 of the accelerator 100 may be defined such that, upon exiting the channel 102, the flow of the cooling fluid F is going approximately the same speed in approximately the same direction as the rotor 34 and rotor blades 70, which can help increase cooling efficiency by reducing relative stagnation between the cooling fluid flow and the rotor 34 and rotor blades 70.

Keeping with FIG. 4A, the channel 102 defines a width W from the inner wall 110 to the outer wall 108, and the width W varies along the channel 102 from the inlet 104 to the outlet 106. In the depicted embodiment, the width W of the channel 102 decreases both from the inlet 104 to the mid-portion 114 and from the mid-portion 114 to the outlet 106 such that the width W at the inlet 104 is larger than the width W at the outlet 106, i.e., $W_{inlet} > W_{outlet}$. Narrowing the channel 102 from the inlet 104 to the outlet 106 helps speed up the flow of the cooling fluid F to the tangential speed of the rotor 34 and rotor blades 70.

As further illustrated in FIGS. 3 and 4, an annular flange 116 extends radially outward from the outer wall 108. In exemplary embodiments, the flange 116 is integrally formed with the outer wall 108, e.g., such that the outer wall 108, the inner wall 110, the plurality of vanes 112, and the flange 116 are integrally formed as a single monolithic component. Moreover, the flange 116 defines a plurality of apertures 118 therein. The apertures 118 are defined about a circumference of the flange 116 such that the apertures 118 are spaced apart from one another about the circumference of the flange 116. As shown in FIG. 2, in exemplary embodiments, the apertures 118 are configured to receive an attachment mechanism, such as a bolt or other suitable fastener, e.g., to secure the accelerator 100 in position within the core turbine engine 16.

In the depicted exemplary embodiment, the flange 116 is substantially parallel to the radial direction R. Further, the flange 116 is disposed radially outward from the outlet 106 such that the flange 116 and the outlet 106 define an aft end 120 of the accelerator 100. More particularly, the flange 116 and the outlet 106 may be generally aligned with one another along the radial direction R and may define the aftmost portions of the accelerator 100.

Additionally, a connecting portion 122, or simply connector 122, may be defined between an inlet end 124 of the outer wall 108 and the flange 116. In the exemplary embodiment illustrated in FIGS. 4A and 4B collectively, the connector 122 is substantially parallel to the axial direction A. A semi-circular fillet 125 is defined between the inlet end 124 of the outer wall 108 and the connector 122. Further, the connector 122 defines an inner surface 126 against which a seal, such as an abradable seal 128, may be disposed, e.g., to provide a fluid seal between the accelerator 100 and the first turbine rotor blade stage 28B.

Also in the illustrated embodiment, an inner wall flange 130 extending axially forward from the inner wall 110. The inner wall flange 130 extends from the inner wall 110 adjacent the mid-portion 114 such that a fillet 132 is defined between the inner wall 110 and the inner wall flange 130 at the mid-portion 114. Moreover, the inner wall flange 130 defines an inner surface 134 against which a seal, such as an abradable seal 128, may be disposed, e.g., to provide a fluid seal between the accelerator 100 and the first turbine rotor blade stage 28B.

The accelerator 100 may define other flanges as well. For example, as shown most clearly in FIG. 4A, a flange 136 may be defined at an inlet end 138 of the inner wall 110. In the depicted embodiment, the flange 136 extends substantially along the radial direction R. Similarly, a flange 140 may be defined at an outlet end 142 of the outer wall 108. In the illustrated embodiment, the flange 140 extends generally along the radial direction R but is slightly angled with respect to the radial direction R. The flanges 136, 140 may help align the accelerator 100 with other engine components, may provide an area for coupling the accelerator 100 to other engine components, etc. Accordingly, other orientations of the flanges 136, 140 than the illustrated orientations also may be suitable.

In general, the exemplary embodiments of the accelerator 100 described herein may be manufactured or formed using any suitable process. However, in accordance with several aspects of the present subject matter, the accelerator 100 may be formed using an additive-manufacturing process, such as a 3D printing process. The use of such a process may allow the outer wall 108, the inner wall 110, and the vanes 112 of the accelerator 100 to be formed integrally, as a single monolithic component, or as any suitable number of subcomponents. In particular, the manufacturing process may allow the outer wall 108, the inner wall 110, and the vanes 112 to be integrally formed and include a variety of features not possible when using prior manufacturing methods. For example, the additive manufacturing methods described herein enable the manufacture of cooling channels and accelerators having any suitable size and shape with one or more configurations of channel walls, channel widths, and channel exit angles, as well as other features which were not possible using prior manufacturing methods, such as smaller features including smaller fillets and smaller holes or apertures, as well as smaller fillet radii. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although additive manufacturing processes for forming the components described herein are described in detail, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as need depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers, unique pseudo flange geometries, tailored cooling cavity sizes and shapes, and/or tailored cooling fluid passageway numbers, shapes, and paths. As a specific example, using additive manufacturing methods such as those described herein, one or more case segments of a compressor case may be formed with uniquely shaped outer surface raised portions that define one or more cavities and/or one or more passageways therein. Further, the cross-sectional shape, number, and/or relative position of each cavity and passageway within a raised portion may vary among the raised portions of a case segment. In addition, although additive manufacturing enables manufacture of single monolithic components as describe herein from a single material, the additive manufacturing process also enables the manufacture of a single component having different materials such that different portions of the component may exhibit different performance characteristics. The successive, additive nature of the manufacturing process enables the construction of these novel features. As a result, the components described herein may exhibit improved performance and reliability.

It should be appreciated that the accelerator 100, having a channel 102 with a compound exit angle for a fluid flowing through the channel, described herein is only for the purpose of explaining aspects of the present subject matter. For example, the accelerator 100 is used herein to describe exemplary configurations, constructions, and methods of manufacturing the accelerator 100. It should be appreciated that the additive manufacturing techniques discussed herein may be used to manufacture other casings or similar components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of the accelerator 100 according to exemplary embodiments of the present subject matter have been presented, an exemplary method 500 is provided for forming an accelerator according to an exemplary embodiment of the present subject matter. Method 500 can be used by a manufacturer to form an outer wall 108 and an inner wall 110 defining a channel 102 therebetween, along with the various other features described herein, and, thus, form the accelerator 100 or any other suitable accelerator. It should be appreciated that the exemplary method 500 is discussed herein only to describe exemplary aspects of the present subject matter and is not intended to be limiting.

Figure 5:
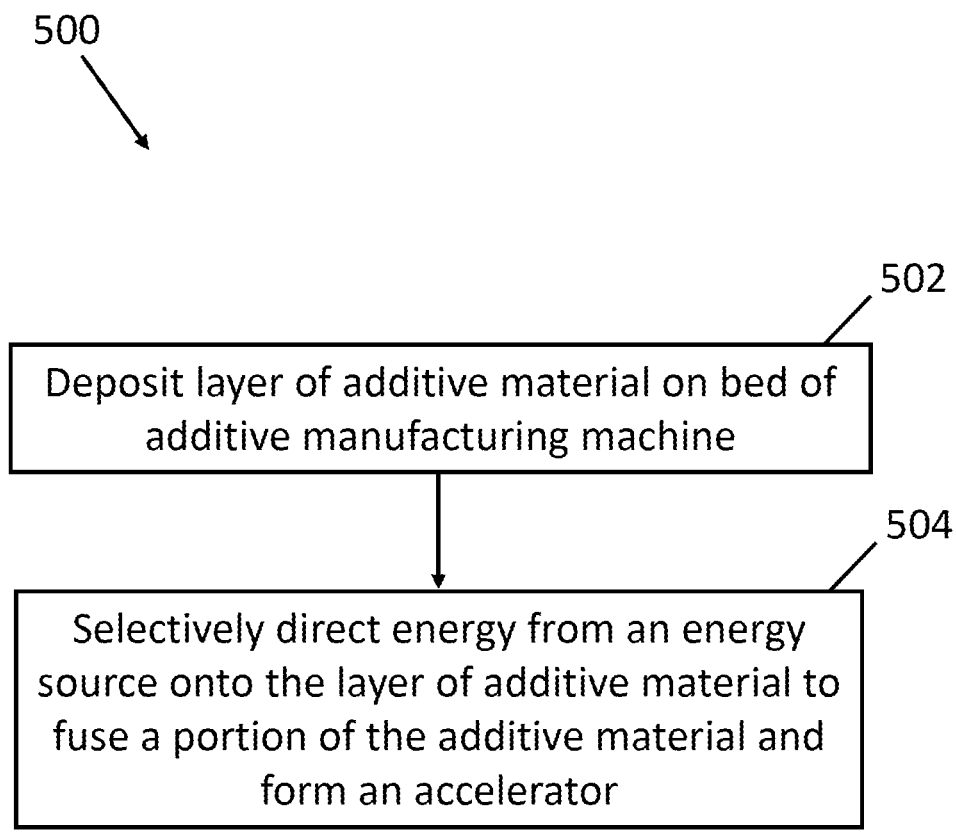
FIG. 5 provides a flow diagram illustrating a method of manufacturing the accelerator of FIG. 3, according to an exemplary embodiment of the present subject matter.

Referring now to FIG. 5, method 500 includes, at block 502, depositing a layer of additive material on a bed of an additive manufacturing machine. Method 500 further includes, at block 504, selectively directing energy from an energy source onto the layer of additive material to fuse a portion of the additive material and form an accelerator. For example, the accelerator may be the accelerator 100 formed for the HP turbine 28 of the core turbine engine 16 of the turbofan jet engine 10 described herein. More particularly, as described herein, the accelerator 100 may comprise an annular outer wall 108, an annular inner wall 110, an annular channel 102 defined between the outer wall 108 and the inner wall 110, and one or more vanes 112 disposed within the channel 102. The channel 102 may include an inlet 104 for ingress of a cooling fluid F into the channel 102 and an outlet 106 for egress of the cooling fluid F from the channel 102. The one or more vanes 112 may each extend from the outer wall 108 to the inner wall 110 at a location adjacent the channel outlet 106. Moreover, the channel outlet 106 may be angled such that an exit angle α of the cooling fluid F is nonzero with respect to both a radial direction R and an axial direction A defined by the accelerator 100. Using the additive manufacturing process of method 500, the outer wall 108, the inner wall 110, and the vane 112 are integrally formed as a single monolithic component. It will be appreciated that the accelerator 100 formed by the additive process of method 500 also may include any or all of the additional features described herein, such as the flange 116 having apertures 118 defined therein, the connector 122, and the flanges 136, 140.

Accordingly, the present subject matter is directed to assemblies, systems, and methods for providing cooling flow to rotor blade stages. More particularly, the present subject matter is directed to an accelerator that introduces a tangential velocity component to cooling air, e.g., turbine stage one cooling air, that is larger than the rotor speed to minimize parasitic power losses in the rotor cavity and pressure losses in the cooling supply circuit, e.g., the stage one blade cooling supply circuit. Further, the accelerator described herein provides high efficiency pumping characteristics to minimize the temperature of blade cooling flow. Moreover, as described herein, the accelerator may be additively manufactured to enable optimized vane geometry and aerodynamic performance beyond traditional casting technology. Still further, the accelerator described herein includes a compound exit angle for the cooling fluid, which enables smaller axial packaging of the engine while maintaining rotor clearances, as well as close coupling between the accelerator and the rotor blades while maintaining rotor clearances. What is more, an accelerator as describe herein reduces exit velocity drop of the arc between the accelerator exit and cooling plate entry, which increases close coupling between the accelerator and rotor blade stage while decreasing cooling fluid jet travel length and velocity degradation, thereby improving cooling system performance. Other benefits and advantages of the present subject matter may be realized as well.

Further aspects of the invention are provided by the subject matter of the following clauses:

An accelerator for a gas turbine engine, the accelerator defining a radial direction and an axial direction, the accelerator comprising an annular outer wall; an annular inner wall; an annular channel defined between the outer wall and the inner wall, the channel having an inlet for ingress of a cooling fluid into the channel and an outlet for egress of the cooling fluid from the channel; and a plurality of vanes disposed within the channel, each vane of the plurality of vanes extending from the outer wall to the inner wall adjacent the outlet, wherein the outlet is angled such that an exit angle of the cooling fluid is nonzero with respect to the radial direction and is nonzero with respect to the axial direction.

The accelerator of any preceding clause, wherein the outer wall, the inner wall, and the plurality of vanes are integrally formed as a single monolithic component.

The accelerator of any preceding clause, wherein the outlet is angled radially inward such that the inlet is disposed radially outward of the outlet.

The accelerator of any preceding clause, wherein each vane of the plurality of vanes has a shape configured to induce a tangential flow of the cooling fluid upon egress from the outlet.

The accelerator of any preceding clause, wherein the channel defines a width from the inner wall to the outer wall, and wherein the width varies along the channel from the inlet to the outlet.

The accelerator of any preceding clause, wherein the channel comprises a mid-portion located between the inlet and the outlet, and wherein the width of the channel decreases both from the inlet to the mid-portion and from the mid-portion to the outlet such that the width at the inlet is larger than the width at the outlet.

The accelerator of any preceding clause, wherein the inner wall is angled with respect to the axial direction.

The accelerator of any preceding clause, wherein the channel comprises a mid-portion located between the inlet and the outlet, wherein the inner wall is defined at a first nonzero angle with respect to the axial direction over a first length, and wherein the inner wall is defined at a second nonzero angle with respect to the axial direction over a second length, the first length defined from the inlet to the mid-portion and the second length defined from the mid-portion to the outlet.

The accelerator of any preceding clause, wherein the first nonzero angle is larger than the second nonzero angle.

The accelerator of any preceding clause, further comprising an annular flange extending radially outward from the outer wall.

The accelerator of any preceding clause, wherein the flange defines a plurality of apertures therein, the plurality of apertures spaced apart from one another about a circumference of the flange.

The accelerator of any preceding clause, wherein the flange is substantially parallel to the radial direction.

The accelerator of any preceding clause, wherein the outer wall, the inner wall, the plurality of vanes, and the flange are integrally formed as a single monolithic component.

The accelerator of any preceding clause, further comprising a connector defined between an inlet end of the outer wall and the flange, wherein the connector is substantially parallel to the axial direction.

The accelerator of any preceding clause, wherein the outer wall, the inner wall, the plurality of vanes, the flange, and the connector are integrally formed as a single monolithic component.

The accelerator of any preceding clause, further comprising an inner wall flange extending axially forward from the inner wall, wherein the channel comprises a mid-portion located between the inlet and the outlet, and wherein the inner wall flange extends from the inner wall adjacent the mid-portion such that a fillet is defined between the inner wall and the inner wall flange at the mid-portion.

The accelerator of any preceding clause, wherein the outer wall, the inner wall, the plurality of vanes, and the inner wall flange are integrally formed as a single monolithic component.

The accelerator of any preceding clause, wherein the outer wall, the inner wall, the plurality of vanes, the flange defining a plurality of apertures therein, the connector, and the inner wall flange are integrally formed as a single monolithic component.

The accelerator of any preceding clause, further comprising a second inner wall flange defined at an inlet end of the inner wall, the second inner wall flange extending substantially along the radial direction.

The accelerator of any preceding clause, wherein the outer wall, the inner wall, the plurality of vanes, and the second inner wall flange are integrally formed as a single monolithic component.

The accelerator of any preceding clause, wherein the outer wall, the inner wall, the plurality of vanes, the flange defining a plurality of apertures therein, the connector, the inner wall flange, and the second inner wall flange are integrally formed as a single monolithic component.

The accelerator of any preceding clause, further comprising an outer wall flange defined at an outlet end of the outer wall, the outer wall flange extending generally along the radial direction.

The accelerator of any preceding clause, wherein the outer wall flange is slightly angled with respect to the radial direction.

The accelerator of any preceding clause, wherein the outer wall, the inner wall, the plurality of vanes, and the outer wall flange are integrally formed as a single monolithic component.

The accelerator of any preceding clause, wherein the outer wall, the inner wall, the plurality of vanes, the flange defining a plurality of apertures therein, the connector, the inner wall flange, the second inner wall flange, and the outer wall flange are integrally formed as a single monolithic component.

The accelerator of any preceding clause, wherein the accelerator comprises a plurality of layers formed by depositing a layer of additive material on a bed of an additive manufacturing machine; and selectively directing energy from an energy source onto the layer of additive material to fuse a portion of the additive material, wherein the outer wall, the inner wall, and the plurality of vanes are integrally formed as a single monolithic component.

The accelerator of any preceding clause, wherein the outlet defines a compound exit angle for the cooling fluid.

A method of manufacturing an accelerator for a gas turbine engine, the method comprising depositing a layer of additive material on a bed of an additive manufacturing machine; and selectively directing energy from an energy source onto the layer of additive material to fuse a portion of the additive material and form the accelerator, the accelerator comprising an annular outer wall, an annular inner wall, an annular channel defined between the outer wall and the inner wall, and a vane disposed within the channel, wherein the channel includes an inlet for ingress of a cooling fluid into the channel and an outlet for egress of the cooling fluid from the channel, wherein the vane extends from the outer wall to the inner wall adjacent the outlet, wherein the outlet is angled such that an exit angle of the cooling fluid has a nonzero radial portion and a nonzero axial portion, and wherein the outer wall, the inner wall, and the vane are integrally formed as a single monolithic component.

The method of any preceding clause, wherein the accelerator further comprises an annular flange extending radially outward from the outer wall, wherein the flange is integrally formed with the outer wall.

The method of any preceding clause, wherein the flange defines a plurality of apertures therein, the plurality of apertures defined about a circumference of the flange.

The method of any preceding clause, wherein the flange is disposed radially outward from the outlet such that the flange and the outlet define an aft end of the accelerator.

A gas turbine engine, comprising a combustor; a first turbine stator vane stage disposed immediately downstream of the combustor, the first turbine stator vane stage comprising an annular array of stator vane airfoils; a first turbine rotor blade stage disposed immediately downstream of the first turbine stator vane stage, the first turbine rotor blade stage comprising an annular array of rotor blade airfoils coupled to a rotatable shaft; and an accelerator circumferentially surrounding the shaft, the accelerator comprising an annular channel for receipt of a cooling fluid, the channel including an outlet defining a compound exit angle for the cooling fluid, wherein the outlet of the accelerator is disposed immediately upstream of the first turbine rotor blade stage to direct the cooling fluid to the first turbine rotor blade stage.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An accelerator for a gas turbine engine, the accelerator defining a radial direction and an axial direction, the accelerator comprising:
    an annular outer wall;
    an annular inner wall;
    an annular channel having a width defined between the outer wall and the inner wall, the channel having an inlet for ingress of a cooling fluid into the channel and an outlet for egress of the cooling fluid from the channel wherein the width of the annular channel continuously decreases between the inlet and the outlet; and
    a plurality of vanes disposed within the channel, each vane of the plurality of vanes extending from the outer wall to the inner wall adjacent the outlet,
    wherein the outlet is angled such that an exit angle of the cooling fluid is nonzero with respect to the radial direction and is nonzero with respect to the axial direction.

2. The accelerator of claim 1, wherein the outer wall, the inner wall, and the plurality of vanes are integrally formed as a single monolithic component.

3. The accelerator of claim 1, wherein the outlet is angled radially inward such that the inlet is disposed radially outward of the outlet.

4. The accelerator of claim 1, wherein each vane of the plurality of vanes has a shape configured to induce a tangential flow of the cooling fluid upon egress from the outlet.

5. The accelerator of claim 1, wherein the channel defines a width from the inner wall to the outer wall, and wherein the width varies along the channel from the inlet to the outlet.

6. The accelerator of claim 5, wherein the channel comprises a mid-portion located between the inlet and the outlet, and wherein the width of the channel decreases both from the inlet to the mid-portion and from the mid-portion to the outlet such that the width at the inlet is larger than the width at the outlet.

7. The accelerator of claim 1, wherein the inner wall is angled with respect to the axial direction.

8. The accelerator of claim 7, wherein the channel comprises a mid-portion located between the inlet and the outlet, wherein the inner wall is defined at a first nonzero angle with respect to the axial direction over a first length, and wherein the inner wall is defined at a second nonzero angle with respect to the axial direction over a second length, the first length defined from the inlet to the mid-portion and the second length defined from the mid-portion to the outlet.

9. The accelerator of claim 8, wherein the first nonzero angle is larger than the second nonzero angle.

10. The accelerator of claim 1, further comprising:
an annular flange extending radially outward from the outer wall.

11. The accelerator of claim 10, wherein the flange defines a plurality of apertures therein, the plurality of apertures spaced apart from one another about a circumference of the flange.

12. The accelerator of claim 10, wherein the flange is substantially parallel to the radial direction.

13. The accelerator of claim 10, further comprising:
a connector defined between an inlet end of the outer wall and the flange,
wherein the connector is substantially parallel to the axial direction.

14. The accelerator of claim 10, further comprising:
an inner wall flange extending axially forward from the inner wall,
wherein the channel comprises a mid-portion located between the inlet and the outlet, and
wherein the inner wall flange extends from the inner wall adjacent the mid-portion such that a fillet is defined between the inner wall and the inner wall flange at the mid-portion.

15. The accelerator of claim 1, wherein the accelerator comprises a plurality of layers formed by:
depositing a layer of additive material on a bed of an additive manufacturing machine; and
selectively directing energy from an energy source onto the layer of additive material to fuse a portion of the additive material,
wherein the outer wall, the inner wall, and the plurality of vanes are integrally formed as a single monolithic component.

* * * * *